US010402526B2

(12) United States Patent
Dosluoglu et al.

(10) Patent No.: US 10,402,526 B2
(45) Date of Patent: Sep. 3, 2019

(54) INTEGRATED SYSTEM OF PDN IMPLEMENTATION AND DIGITAL CO-SYNTHESIS

(71) Applicants: Taner Dosluoglu, New York, NY (US); Anatoly Gelman, San Diego, CA (US)

(72) Inventors: Taner Dosluoglu, New York, NY (US); Anatoly Gelman, San Diego, CA (US)

(73) Assignee: Chaoyang Semiconductor Jiangyin Technology Co., Ltd., Jiangyin (CN)

( * ) Notice: Subject to any disclaimer, the term of this patent is extended or adjusted under 35 U.S.C. 154(b) by 0 days.

(21) Appl. No.: 15/174,877

(22) Filed: Jun. 6, 2016

(65) Prior Publication Data

US 2016/0357882 A1   Dec. 8, 2016

Related U.S. Application Data

(60) Provisional application No. 62/171,979, filed on Jun. 5, 2015.

(51) Int. Cl.
*G06F 17/50* (2006.01)

(52) U.S. Cl.
CPC ........ *G06F 17/505* (2013.01); *G06F 17/5022* (2013.01); *G06F 17/5036* (2013.01); *G06F 17/5068* (2013.01); *G06F 2217/78* (2013.01)

(58) Field of Classification Search
CPC .... G06F 17/5036; G06F 2217/78; G06F 1/26; G06F 1/3203; G06F 1/3296; G06F 2217/82; G06F 1/28; G06F 17/505; G06F 17/5022; Y02B 60/1285
See application file for complete search history.

(56) References Cited

U.S. PATENT DOCUMENTS

| | | | |
|---|---|---|---|
| 7,802,216 B2 | 9/2010 | Malek-Khosravi et al. | |
| 7,945,889 B2* | 5/2011 | Hsu | G06F 17/5036 703/13 |
| 7,984,398 B1 | 7/2011 | Jadcherla | |
| 8,286,110 B1* | 10/2012 | Kukal | G06F 17/5036 716/106 |
| 2005/0108667 A1 | 5/2005 | Iadanza et al. | |
| 2006/0095874 A1 | 5/2006 | Jiang et al. | |
| 2010/0037188 A1 | 2/2010 | Jamann et al. | |
| 2011/0093825 A1 | 4/2011 | Baumgartner et al. | |
| 2012/0151225 A1* | 6/2012 | Huang | G06F 1/26 713/300 |
| 2013/0191799 A1 | 7/2013 | Yasunaka | |
| 2014/0333134 A1 | 11/2014 | Hoberman et al. | |
| 2015/0154337 A1* | 6/2015 | Fang | G06F 17/5077 716/120 |
| 2015/0213186 A1 | 7/2015 | Le Bars | |

(Continued)

FOREIGN PATENT DOCUMENTS

WO    WO 2013-184959 A1    12/2013

OTHER PUBLICATIONS

International Search Report on related PCT Application No. PCT/US2016/036103 from International Searching Authority (KIPO) dated Sep. 21, 2016.

(Continued)

*Primary Examiner* — Nha T Nguyen
(74) *Attorney, Agent, or Firm* — Klein, O'Neill & Singh, LLP (57) ABSTRACT

Design of a power delivery network (PDN) is integrated with a digital logic design flow.

9 Claims, 6 Drawing Sheets

(56) References Cited

U.S. PATENT DOCUMENTS

2015/0248513 A1    9/2015   Pandey et al.
2015/0302137 A1   10/2015   Cheng
2015/0331981 A1   11/2015   Mulvaney
2015/0364994 A1*  12/2015   Dosluoglu .............. H02M 1/32
                                                   327/306

OTHER PUBLICATIONS

Written Opinion on related PCT Application No. PCT/US2016/036103 from International Searching Authority (KIPO) dated Sep. 21, 2016.
Extended European Search Report (EESR) on related European Patent Application No. 16804672.0 from the European Patent Office (EPO) dated Jun. 12, 2018.
Zhang, Runjie, "Pre-RTL On-Chip Power Delivery Modeling and Analysis", Dissertation, May 1, 2015, pp. 1-148, XP055480216.
Kapadia, Nishit et al., "PRATHAM: A Power Delivery-Aware and Thermal-Aware Mapping Framework for Parallel Embedded Applications on 3D MPSoCs", 2014 IEEE 32nd International Conference on Computer Design (ICCD), IEEE, Oct. 19, 2014, pp. 525-528, XP032695611.
Yoshikawa, Kumpei et al., "Measurements and Co-Simulation of On-Chip and On-Board AC Power Noise in Digital Integrated Circuits", 2011 8th Workshop on Electromagnetic Compatibility of Integrated Circuits (EMC COMPO), IEEE, Nov. 6, 2011, pp. 76-81, XP032095178.
Kapadia, Nishit et al., "A Power DeliveryNetwork Aware Framework for Synthesis of 3D Networks-on-Chip with Multiple Voltage Islands", 2012 25th International Conference on VLSI Design (VLSID), IEEE, Jan. 7, 2012, pp. 262-267, XP032130905.

* cited by examiner

INTEGRATED SYSTEM OF PDN IMPLEMENTATION AND DIGITAL CO-SYNTHESIS

CROSS REFERENCE TO RELATED APPLICATION

This application claims the benefit of the filing date of U.S. Provisional Patent Application No. 62/171,979, filed on Jun. 5, 2015, the disclosure of which is incorporated by reference herein.

BACKGROUND OF THE INVENTION

The present invention relates generally to integrated circuit design, and more particularly to integration of power delivery network design and digital logic design flows.

Digital logic circuitry for integrated circuits are often designed using a number of design tools, with operation of the tools being arranged in a sequence, which may considered to provide a digital logic design flow. Very often, these design flows include specifying digital circuit operations, for example using a hardware description language (HDL) such as Verilog or VHDL, creating a register transfer level (RTL) description of the circuit based on the HDL, synthesizing the RTL description to a netlist, and using a place and route tool to determine placement of gates of the netlist and routing of signals between the gates. In addition, generally various testing schemes are applied at each stage of the process, generally to determine if each stage is formally equivalent to a prior stage, and steps of the process may be repeated depending on the outcome of the tests.

The digital logic design flow is generally effective at reducing costs for design of integrated circuitry, and for providing integrated circuit designs that meet functional requirements.

Some portions of semiconductor ICs, however, are generally designed outside of the digital logic design flow. For example, power distribution network (PDN) circuitry, including on-chip voltage regulators and associated circuitry, are generally specialized circuits that are specially handled in the design process, and not incorporated into the digital logic design flow. Instead, the PDN may be specially designed and specially placed, which may result in inconsistencies or undesired effects.

BRIEF SUMMARY OF THE INVENTION

Some embodiments in accordance with aspects of the invention provide for integration of power delivery network design into a digital logic design flow.

Some embodiments in accordance with aspects of the invention provide a method useful in integrated circuit design, comprising: receiving, by a computer, parameters for a power delivery network (PDN); receiving, by the computer, a model of logic circuitry for an integrated circuit; simulating operation of a plurality of configurations of the PDN for the model of logic circuitry over a specified range of minimum voltages; generating a netlist representation of a selected PDN configuration; and processing the netlist representation of the selected PDN configuration along with a digital circuit design for the logic circuitry.

These and other aspects of the invention are more fully comprehended upon review of this disclosure.

DETAILED DESCRIPTION

Figure 1:
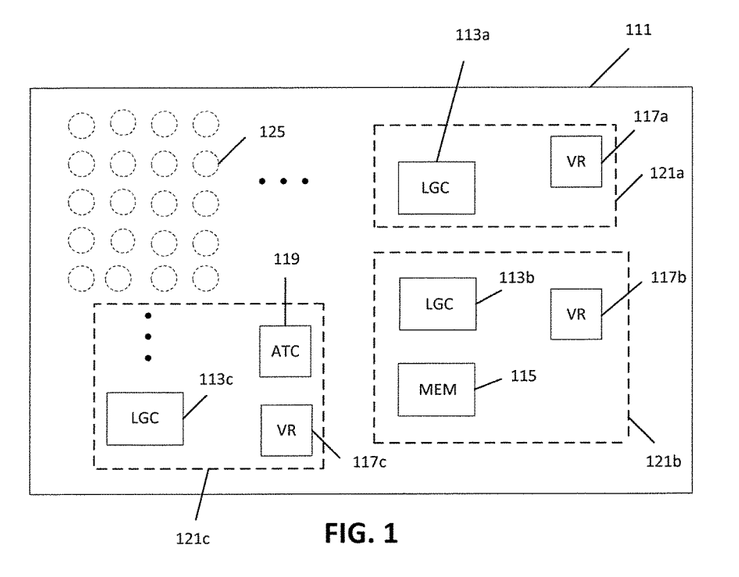
FIG. 1 is a block diagram of an integrated circuit chip (IC).

FIG. 1 is a block diagram of an integrated circuit chip (IC) 111. The IC includes a plurality of logic elements 113a-c. The logic elements perform various digital logic functions, and may include processor circuitry or other circuitry for processing data or performing other functions. The IC also includes memory circuits 115 for storing data. It should be recognized, however, the logic elements themselves may include some circuits, for example flip-flops and other items, which themselves may be considered memory circuits at times, and the number and groupings of logic elements and/or memory elements may vary significantly from that which is explicitly shown in FIG. 1.

The IC also includes a plurality of embedded voltage regulators 117a-c. Each of the voltage regulators regulates voltage provided to elements within corresponding power islands or domains 121a-c, with each power island including some logic and/or memory elements. In the IC of FIG. 1, one of the power islands, power island 117c, is also shown as including an automatic transient control (ATC) circuit 119. The ATC circuit reduces effects of transients in a power delivered by the voltage regulator 117c to the logic element 113c within power island 121c. The transients may be most noticeable, and possibly have a greatest effect on proper circuit operation, when logic element 113c transitions between a state in which the logic element is performing large amounts of processing and a state in which the logic element may be essentially powered off and performing little to no processing.

The IC of FIG. 1 also includes a plurality of solder bumps 125 for providing transmission of signal into or out of the IC. In general, many of the bumps are or will be coupled to data sources or sinks, and some are also coupled to power elements, for example one or more power sources, for example batteries, or other items, for example capacitors and/or inductors, which may be located off-chip.

Figure 2:
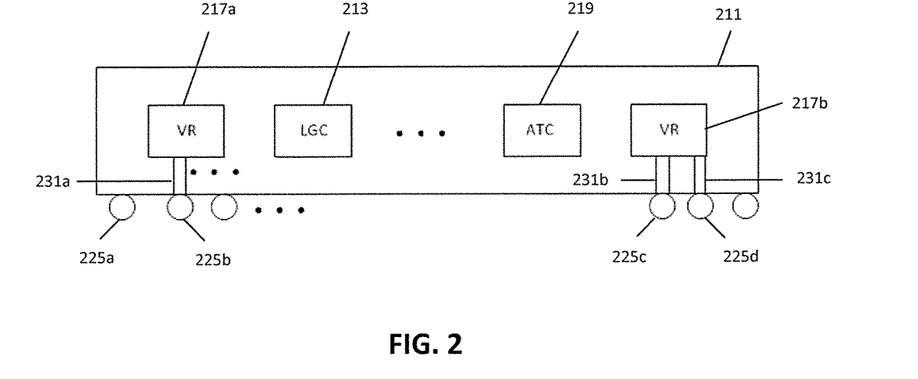
FIG. 2 shows a partial cut away side view of an IC.

The voltage regulators, ATC circuits, and bumps utilized for power related purposes may all be considered part of a power delivery network (PDN) of the IC, which may also include on-chip capacitors (not explicitly shown in FIG. 1). The number of voltage regulators and ATC circuits provided, as well as their characteristics, may effect design (including layout) and operation of other elements of the IC. In addition, the number of bumps utilized may also effect design and operation of the other elements of the IC. For example, FIG. 2 shows a partial cut away side view of an IC 211 having a logic element 213, an ATC circuit 219, and a plurality of bumps 225a-d. In the IC of FIG. 2, it may be seen that one voltage regulator 217a may receive power through a single bump 225b/via 231a combination. A second voltage regulator 217b, however, may receive power through a parallel paths of a bump 225c/via 231b combination and a bump 225d/via 231c combination. By receiving power along two paths, instead of one, characteristics of the voltage regulator may be changed, for example in allowing for more efficient reception of greater power.

In the embodiment of FIG. 1, position in the IC of the voltage regulators and ATC circuits, and the PDN as whole in various embodiments, is largely, and in some embodiments entirely, determined by automated tools, for example a place and route tool. In various embodiments information regarding the voltage regulators, ATC circuits, and power related bumps is provided, as part of the design process, as a netlist (or other tool specific data structure), which, in conjunction with digital logic netlist(s) (or other tool specific data structures), is operated on by additional tools (including additional synthesis steps) in creation of the IC design.

Figure 3:
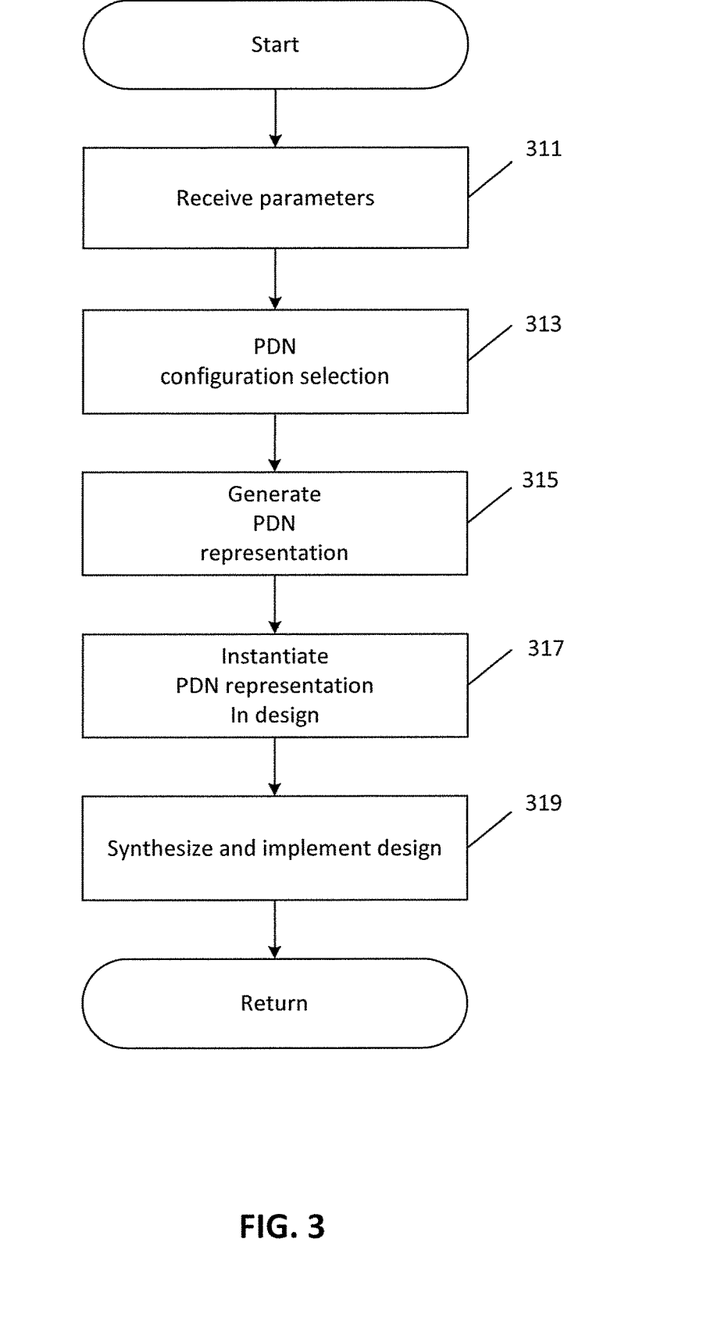
FIG. 3 is a flow diagram of a process useful in designing an integrated circuit, in accordance with aspects of the invention.

FIG. 3 is a flow diagram of a process useful in designing an integrated circuit, in accordance with aspects of the invention. In some embodiments the process of FIG. 3 is performed by one or more processors, for example of a personal computer, workstation, or server.

In block 311 the process receives parameters relating to a power delivery network (PDN). The parameters may include, in various embodiments some or all of voltage regulator error and efficiency parameters, ATC circuit error parameters, voltage regulator and ATC circuit area requirements, and voltage regulator and ATC bump requirements. In addition, in some embodiments the process receives parameters relating to bump physical properties (for example bump resistance and inductance), maximum bump density, on-die capacitor capacitance and area.

In block 313 the process receives a PDN configuration selection. In some embodiments the PDN configuration selection includes a number of bumps for the power delivery network, a number of voltage regulators for the power delivery network, and a number of capacitors for the power delivery network.

In block 315 the process generates a representation of a power delivery network for instantiation in a design of an IC. In some embodiments the representation is in a form of a netlist. In some embodiments the representation is in the form of a tool-specific data structure.

In block 317 the process instantiates the representation of the power delivery network in the design of the IC.

In block 319 the process processes the design of the IC, including the instantiated representation of the power delivery network. In some embodiments the process processes the design by performing a further synthesis of the design. In some embodiments the process processes the design by placing circuitry of the design in a layout, and determining routing of signals between elements of the circuitry.

The process thereafter returns.

Figure 4:
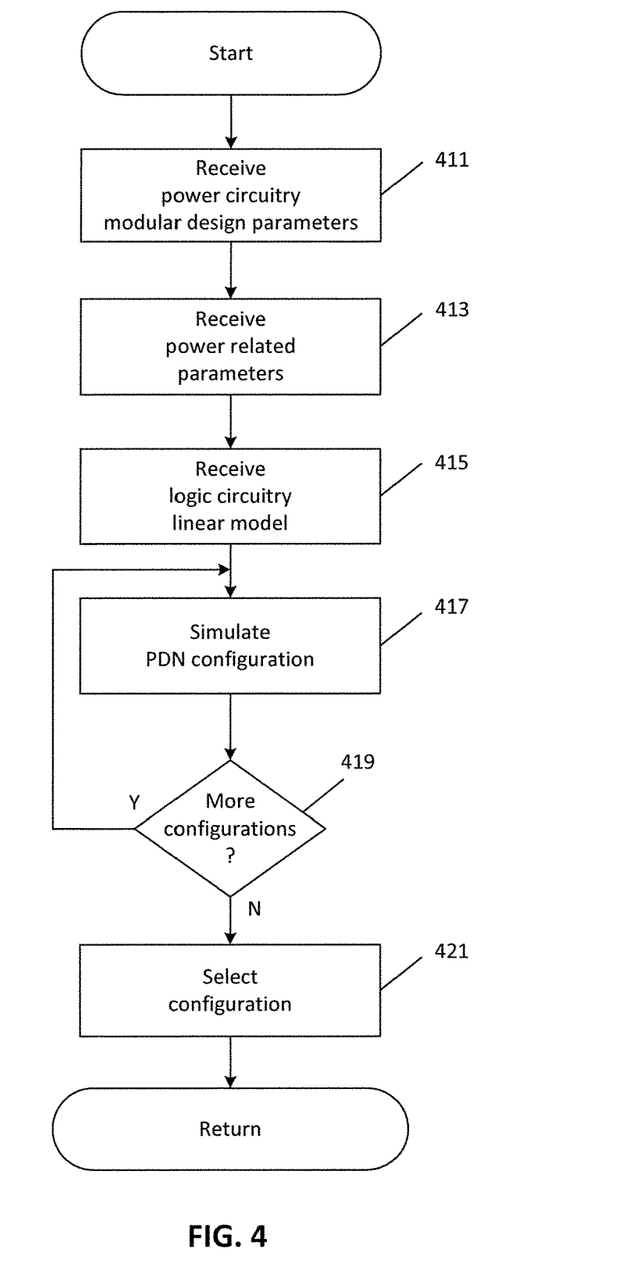
FIG. 4 is a flow diagram of a process useful in designing an integrated circuit, in accordance with aspects of the invention.

FIG. 4 is a flow diagram of a process useful in designing an integrated circuit, in accordance with aspects of the invention. In some embodiments the process of FIG. 4 is performed by one or more processors, for example of a personal computer, workstation, or server.

In block 411 the process receives power circuitry modular design parameters. In some embodiments the power circuitry modular design parameters include modular voltage regulator and ATC circuit designs, and parameters relating to voltage regulator error and efficiency, ATC circuit error, voltage regulator area, ATC circuit area, voltage regulator bump requirements, and ATC circuit bump requirements.

In block 413 the process receives power related parameters. In some embodiments the power related parameters include bump inductance and resistance, maximum bump density, on-die capacitor capacitance and area, a board IR drop budget, a package IR drop budget, an on-die IR drop budget, a maximum ramp current, a ramp time, and a nominal Vdd.

In block 415 the process receives an indication of a logic circuitry model. In some embodiments the indication of the logic circuitry model comprises an area and current model for the logic circuitry at a minimum Vdd and a target frequency. In some embodiments the indication of the logic circuitry is based on a synthesis sweep of a description of the logic circuitry at a target frequency.

In block 417 the process simulates a model of a configuration of a power delivery network. In many embodiments the model is based on the power circuitry modular design parameters and the power related parameters, and the simulation is over a range of Vdd minimum voltages. In some embodiments the model specifies a particular number of PDN bumps, number of voltage regulators and/or voltage regulator configurations, number of ATC circuits and/or ATC configurations, and number of on-die capacitors and/or capacitance of on-die capacitors. In some embodiments the process determines a nominal Vdd for the configuration and area and power efficiency for the configuration. In some embodiments the simulation for the configuration is performed over a range of possible Vdd minimums. In some embodiments the process determines a Vdd minimum for power supplied by the PDN.

Figure 6:
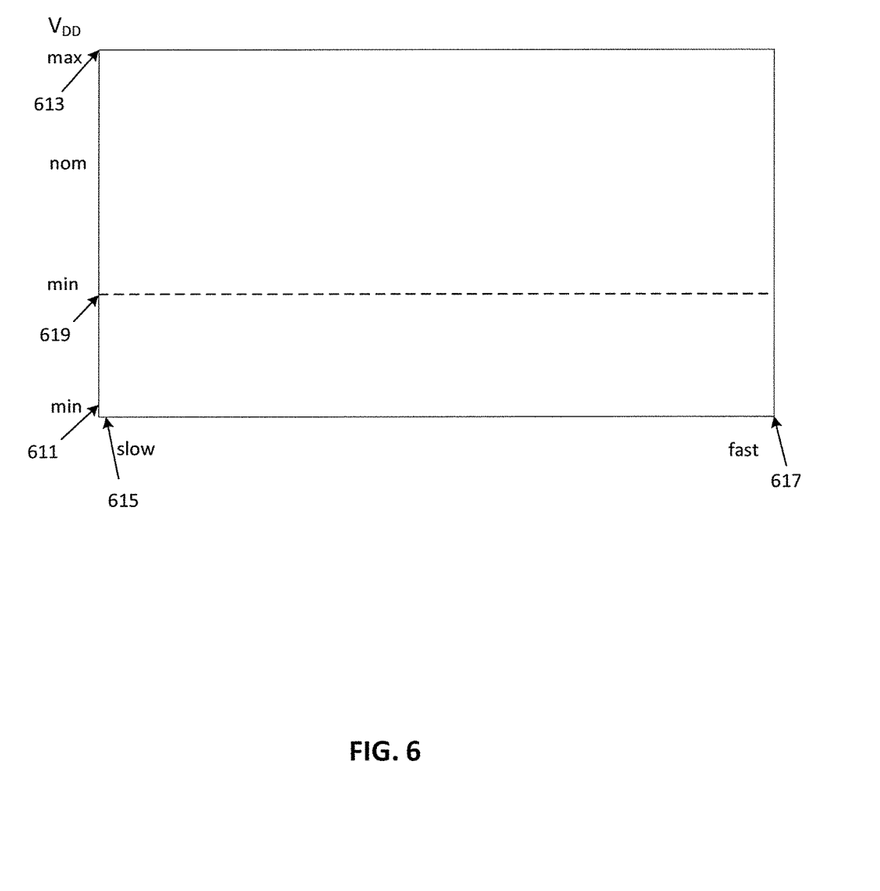
FIG. 6 is a chart illustrating an effective increase in Vdd min.

In block 419 the process determines if there are more PDN configurations to simulate. If so, the process returns to block 417 and simulates a model of a further configuration of the PDN. In some embodiments a plurality of PDN configurations are simulated to determine a PDN configuration that is able to provide a maximum Vdd minimum for power supplied by the PDN. For example, FIG. 6 illustrates a chart of Vdd and process speeds, with Vdd ranging from a minimum voltage 611 through a maximum voltage 613, and process speed ranging from slow speed 615 to a fast speed 617. Generally, timing closure is most difficult to reach for a design that is what may be termed a slow corner of the design, one at which power is low and process speeds are low. If, however, minimum Vdd may be raised to a higher voltage, for example a second minimum voltage 619, designs are less likely to fall into what could be the slow corner, and more likely to reach timing closure.

If there are no more PDN configurations to simulate, the process continues to block 421. In block 421 the process receives a selection of a PDN configuration.

The process thereafter returns.

Figure 5:
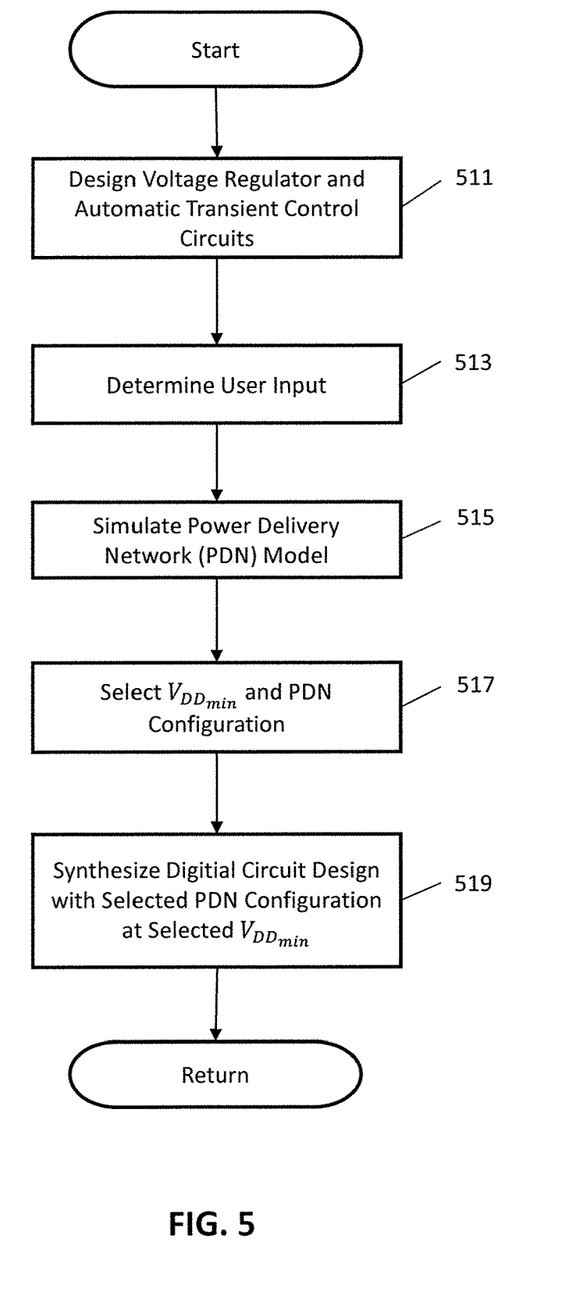
FIG. 5 is a flow diagram of a process useful in synthesizing digital circuit with power delivery network (PDN) configuration in accordance with aspects of the invention.

FIG. 5 is a flow diagram of a process useful in synthesizing digital circuit with power delivery network (PDN) configuration in accordance with aspects of the invention. In some embodiments, the process is performed by a personal computer desktop or laptop equipped with logic synthesis tools.

At block 511, a voltage regulator (VR) and an automatic transient control (ATC) are designed in a modular fashion. The VR and ATC are functional components of the PDN with the VR acting as a switching voltage regulator in some embodiments. Designing the VR and ATC in a modular fashion, for example, is efficient to shorten design and development times. In addition, doing such would allow the VR and the ATC to be tested in a modular manner such that each module is isolated and tested separately. The VR and ATC, however, are tested together in some embodiments. Designing of the VR and ATC, for example, may begin with abstract models. The VR and ATC abstract models are translated into synthesizable Register Transfer Level (RTL)

models which represent high-level representations of the VR and ATC. The RTL models are then translated into structural models which are logic descriptions of the VR and ATC. In some embodiments, schematic block structures or hardware description languages such as VHDL and Verilog are used to create the RTL models. The structural models may be logic-gate-level or transistor-level descriptions of the VR and ATC. When designing the VR and the ATC, various design parameters are determined and captured. The design parameters include the following: voltage regulator error rate, voltage regulator efficiency, automatic transient control error rate, voltage regulator area, automatic transient control area, voltage regulator bump requirements, and automatic transient control bump requirements. The voltage regulator error rate, for example, imposes a maximum tolerable output voltage error rate on the VR design. The voltage regulator efficiency, for example, imposes a minimum output power-to-input power ratio on the VR design. The automatic transient control error rate, for example, imposes a maximum tolerable output power error rate on the ATC design. The voltage regulator area and automatic transient control area, for example, impose form factor design constraints on the VR and ATC respectively. The voltage regulator and the automatic transient control areas are generally rated per square millimeter. The voltage regulator bump requirements and automatic transient control requirements, for example, impose design constraints on the voltage regulator bump and the automatic transient control bump respectively. Bump requirements may include material type, bump height (generally measured in microns), and selection of solder paste or ball. The process then continues to block 513.

At block 513, user design inputs are received for various components of the PDN. The user inputs include the following: bump properties, maximum bump density, cost per bump as translated into equally priced silicon area, on-die metal capacitor capacitance and area, on-die gate capacitor capacitance and area, IR drop budgets, ramp current, ramp time, nominal power supply voltage ($V_{DD_{nom}}$), PDN optimization search range and granularity, and voltage regulator efficiency target. Bump properties, for example, may include capacitance, inductance, and resistance levels of a bump or copper pillar. Maximum bump density in general is measured in microns. IR drop budgets refers to acceptable IR drops across several components such as board, package substrate, and die that do not affect timing and functionality of a design.

In some embodiments, at block 513, additional user design inputs are determined for the PDN. The additional user inputs include area versus minimum power supply voltage ($V_{DD_{min}}$) and current versus $V_{DD_{min}}$ piecewise linear models for synthesized design from a synthesis sweep at a target frequency. For example, area-$V_{DD_{min}}$ and current-$V_{DD_{min}}$ piecewise approximations may be plotted with several linear segments to indicate characteristic of the PDN. In some embodiments, the area-$V_{DD_{min}}$ and current $V_{DD_{min}}$ piecewise approximations may be plotted with a single linear segment with two data-points to indicate characteristic of the PDN. The process then continues to block 515.

At block 515, while not exceeding $V_{DD_{nom}}$ and within required efficiencies, the process runs simulation model over a user-specified range of $V_{DD_{min}}$ to identify best-for-area, best-for-power, and a plurality of PDN configurations based on the captured design parameters of the VR and ATC and the user inputs from block 513. Each of the plurality of PDN configurations includes number of bumps or copper pillars, embedded voltage regulator (EVR) configuration, ATC configuration, and on-die capacitors. Best-for-area, for example, may be the least VR and ATC areas (generally rated per square millimeter) that generate an optimized PDN. Best-for-power, for example, may be the least power consumption by the VR and ATC that generates an optimized PDN. The process then continues to block 517.

At block 517, the process selects a $V_{DD_{min}}$ and a desired PDN configuration based on the best-for-area and the best-for-power identified in block 515. The desired PDN configuration includes number of bumps or copper pillars, EVR configuration, ATC configuration, and on-die capacitors. The $V_{DD_{min}}$ for example may be selected from the user-specified range of $V_{DD_{min}}$ in block 513. The desired PDN configuration for example may be selected from one of the plurality of PDN configurations identified and generated in block 513. The process thereafter proceeds to block 519.

At block 519, the process generates a netlist or database representation of PDN components and interconnects based on the desired PDN configuration. In some embodiments, the PDN components and interconnects include the EVR, ATC, and on-die capacitors. The netlist, for example, may be generated as a result of performing a synthesis process that synthesizes the PDN components and interconnects. The netlist is generally in a text file or American Standard Code for Information Interchange (ASCII) format that contains relevant information of structural models of the PDN components and interconnects. The information for example may include cells used, cell interconnections, high side voltage (e.g., $V_{DD}$, $V_{CC}$), low side voltage (e.g., $V_{SS}$, GND), and area used. In addition to generating the netlist, the synthesis process in some embodiments converts the RTL models of the PDN components and related interconnect to structural models such as gate-level descriptions. The synthesis process, for example, may be performed by synthesis tools such as Cadence RTL Compiler and Synopsys Design Compiler.

Also at block 519, the process instantiates the PDN components and interconnects into a digital circuit design. The process, for example, may incorporate the netlist of the PDN components and interconnects into RTL models of the digital circuit design. In some embodiments, the netlist of the PDN components and interconnects is instantiated into the digital circuit design by adding the netlist into model libraries of a synthesis tool prior to synthesizing the digital circuit design.

Further in block 519, the process synthesizes and implements the digital circuit design with the instantiated netlist of the PDN components and interconnects at the selected $V_{DD_{min}}$. Synthesizing the digital circuit design, for example, may generate another netlist that contains relevant information of structural models of the PDN components and interconnects and the digital circuit. In some embodiments the generated netlist may then be compiled by a personal computer (e.g., desktop or laptop) equipped with a simulation tool (e.g., Cadence, SPICE) to generate input and output waveforms of the digital circuit with the PDN components and interconnects.

Figure 7:
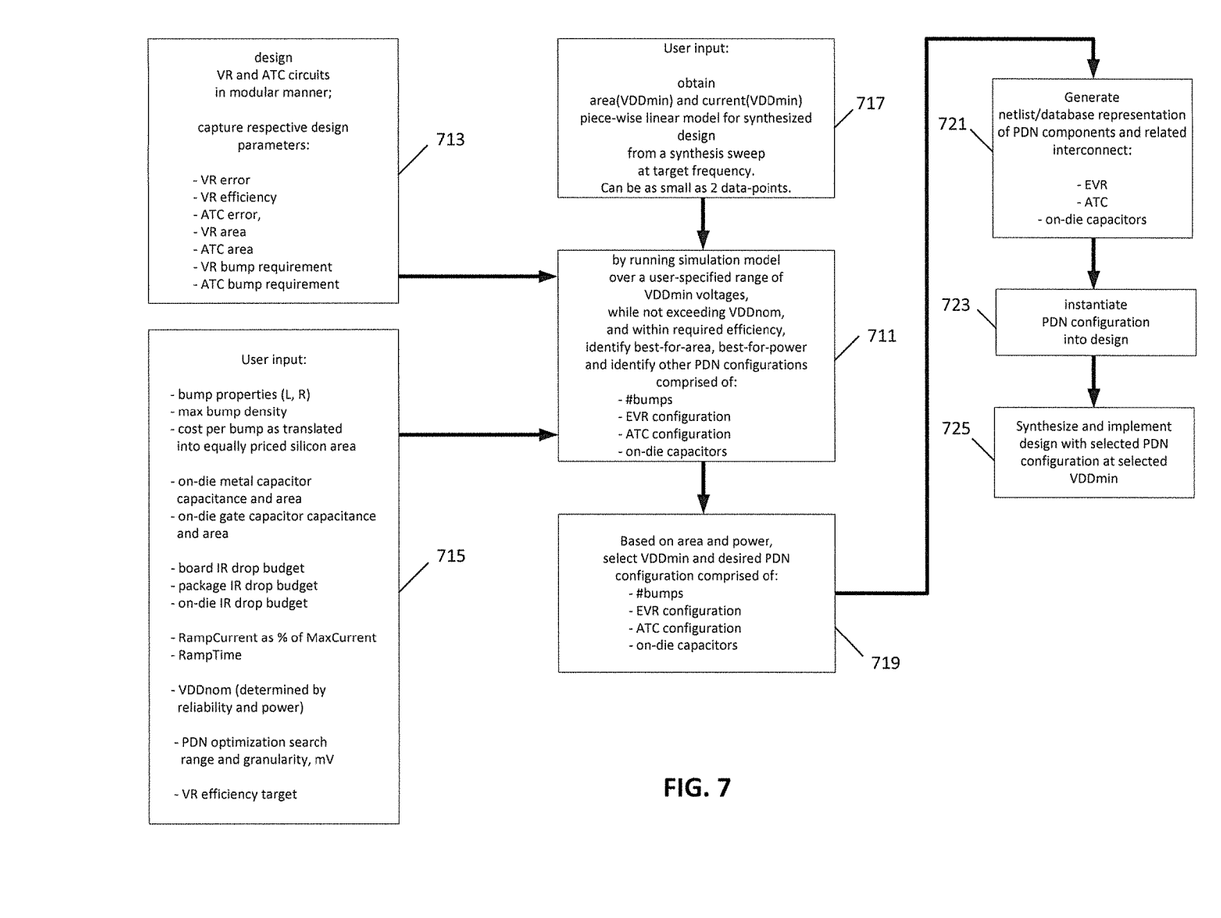
FIG. 7 is a chart showing a further embodiment of a process flow in accordance with aspects of the invention.

FIG. 7 is a chart showing a further embodiment of a process flow in accordance with aspects of the invention. The process flow includes execution of simulations of PDN configurations for a large circuitry model in block 711. The PDN configurations make use of voltage regulator (VR) and automatic transient control (ATC) module parameter inputs 713, other PDN related parameter inputs 715, and inputs providing for area and current information 717 for the logic circuitry model. In block 719 one of the PDN configurations is selected for use. In block 721 a netlist or database representation of the selected PDN configuration is generated, and in block 723 the PDN configuration is instantiated into a design including a logic circuitry design. In block 725 the design is synthesized and thereafter implemented.

Although the invention has been discussed with respect to various embodiments, it should be recognized that the invention comprises the novel and non-obvious claims supported by this disclosure.

What is claimed is:

1. A method useful in integrated circuit design, comprising:
   receiving, by a computer, design parameters for a power delivery network (PDN) to be instantiated in an integrated circuit chip (IC);
   receiving, by the computer, a model of logic circuitry to be instantiated in the IC;
   simulating, using the computer, operation of a plurality of configurations of the PDN based on the design parameters, for the model of logic circuitry over a specified range of minimum voltages to indicate a best-for-area PDN configuration and a best-for-power PDN configuration of the plurality of configurations of the PDN;
   generating, using the computer, a netlist representation of a selected PDN configuration of the plurality of configurations of the PDN, the selected PDN configuration being the best-for-area PDN configuration or the best-for-power PDN configuration;
   processing, using the computer, the netlist representation of the selected PDN configuration along with a digital circuit design for the logic circuitry to generate a combined digital circuit design of the selected PDN and logic circuitry; and
   synthesizing, using the computer, the combined digital circuit design of the selected PDN and logic circuitry, for use in implementing the IC for the combined digital circuit design of the PDN and logic circuitry.

2. The method of claim 1, wherein processing the netlist representation of the selected PDN configuration along with the digital circuit design for the logic circuitry further comprises adding the netlist representation of the selected PDN configuration into model libraries of a synthesis tool prior to synthesizing the netlist representation of the selected PDN configuration along with the digital circuit design for the logic circuitry.

3. The method of claim 1, wherein processing the netlist representation of the selected PDN configuration along with the digital circuit design for the logic circuitry comprises placing of elements of the PDN configuration and the digital circuit design in a layout and determining routing of signals between the elements.

4. The method of claim 1, wherein the parameters for the PDN comprise voltage regulator (VR) error, VR efficiency, and VR area.

5. The method of claim 4, wherein the parameters for the PDN further comprise bump properties and on-die metal capacitor capacitance and area.

6. The method of claim 1, wherein the model of logic circuitry comprises a model of area and current for the logic circuitry.

7. The method of claim 1, wherein the netlist representation includes information regarding a number of bumps for the PDN.

8. The method of claim 1, wherein the parameters for the PDN comprise automatic transient control (ATC) circuit area.

9. The method of claim 8, wherein the netlist representation of the selected PDN configuration includes information regarding a number of embedded voltage regulators and a number of ATC circuits.

\* \* \* \* \*